May 12, 1953 R. IREDELL, JR 2,637,986
FLEXIBLE SHAFT COUPLING
Original Filed Dec. 11, 1944

INVENTOR.
Robert Iredell Jr.
BY
Evans + McCoy
ATTORNEYS

Patented May 12, 1953

2,637,986

UNITED STATES PATENT OFFICE 2,637,986

FLEXIBLE SHAFT COUPLING

Robert Iredell, Jr., Wabash, Ind., assignor to The General Tire & Rubber Company, Akron, Ohio, a corporation of Ohio Original application December 11, 1944, Serial No. 567,585, now Patent No. 2,562,359, dated July 31, 1951. Divided and this application January 10, 1951, Serial No. 205,300

3 Claims. (Cl. 64—11)

This invention relates to flexible couplings and to a method of making the same. It particularly relates to flexible couplings between driven and driving members which permit a relatively wide angle of misalignment between the shafts of respective members. This is a division of my co-pending application Serial No. 567,585 filed December 11, 1944, now U. S. Patent No. 2,562,359.

It has been recognized that rubber and soft vulcanized rubbery polymers when maintained under high compression are capable of sustaining much greater unit loading, either when such loads are applied in direct compression or in a direction such that the rubber is deformed primarily by shearing stresses. It has heretofore been proposed to utilize tubular rubber under radial compression as a resilient coupling between driving and driven members. However, to obtain relatively low torsional windup under heavy loading and to prevent hunting between the driven and driving members, it is desirable to utilize the rubber in relatively thin radial section. Such a relatively thin section of rubber under substantial radial compression, however, is subjected to relatively excessive localized stresses when the shafts are not in substantial alignment and this defect has limited the field of use of such couplings.

It is an object of the present invention to provide flexible couplings which utilize only a relatively small amount of rubber initially under radial compression, but which permit coupling of rotating shafts which are in substantial misalignment.

It is an object of the present invention to provide a flexible shaft coupling which has relatively low torsional windup.

It is another object of the present invention to provide flexible shaft couplings which have the above-mentioned desirable properties of rubber under high radial compression, which permit relatively great misalignment without subjecting portions of the rubber to excessive or deteriorating strain, and which may be readily assembled together without special apparatus.

It is still another object of the present invention to provide a method of making flexible couplings which permit relatively wide angle distortion and which are capable of transmitting high torque without substantial windup.

Other objects will be apparent from the following description of the invention as illustrated by the accompanying drawings, in which.

Figure 1:
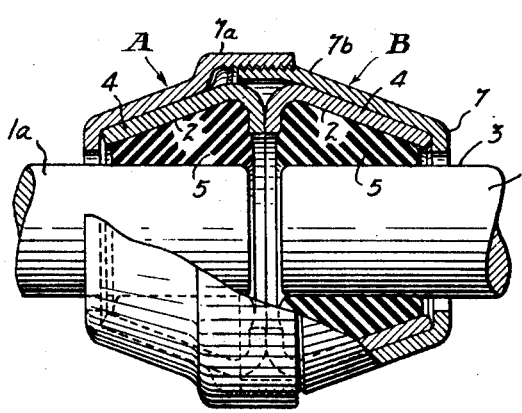
Figure 1 is an elevational view, partly in section, of a flexible coupling embodying the present invention.
Figure 2:
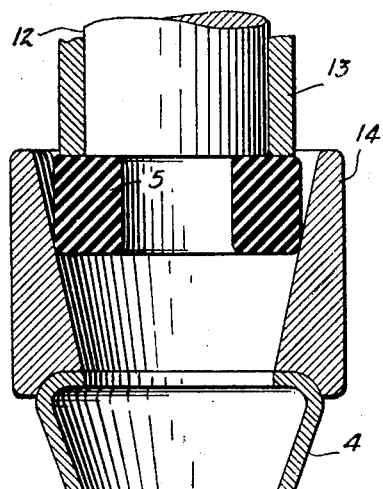
Fig. 2 is a vertical sectional view of a portion of the coupling embodying the present invention and of a portion of the apparatus which may be used in effecting its assembly, showing the first step in the assembly of resilient material within a tapered or frusto-conical, annular, rigid member.

The above objects are accomplished by utilizing as a torque-transmitting resilient member in couplings of the present invention an annular rubber member under a state of radial compression and having a longitudinal non-uniform thickness. The rubber member has substantially greater thickness adjacent the center of the coupling or adjacent the end portion of at least one of the shafts being coupled than at the edge of the coupling. Since a portion of the resilient material is of relatively thin section, that portion is capable of transmitting relatively high torque without appreciable annular distortion and the tendency for hunting between the shafts is reduced to a minimum. By having relatively great thickness near the end portion of the shaft where the greatest deflection due to shaft misalignment occurs, a great degree of misalignment between the shafts is readily taken care of without localized overheating of the rubber.

Referring more particularly to the drawing, in which like parts are designated by like numerals of reference throughout the several views, the couplings of the present invention have at least one portion A or B comprising an inner rigid member 1a or 1b, which may be a driven or driving shaft or a member making rigid connection with the same and which preferably has an outer cylindrical surface 3; an outer rigid member 4 with a longitudinally or axially tapered inner surface 2 at an angle to the outer surface 3 of the inner member; an annular resilient member 5, which is of rubberlike material, a soft vulcanized rubber or synthetic rubber compound and which has portions thereof under substantial radial compression between said inner and outer rigid members, and in adherent non-slipping union therebetween; and means such as a collar or housing portion 7 of said outer rigid member for connecting said outer rigid member to a shaft or outer rigid member of another portion. The outer rigid member may be annular, in one piece, as shown in Figs. 1 to 5.

In accordance with the present invention, the separation between the inner and outer members of at least one portion A or B is variable in a longitudinal or axial direction, the maximum separation occurring near the end of the shaft or inner member. The resilient material 5 is in the deformed state in the coupling, wedge shaped in cross-section, or has greater thickness adjacent the end portions 10 of the shaft or shaft portion where greatest strain is ordinarily had due to misalignment of driving and driven shafts.

The outer rigid member 4 is preferably tapered or has frusto-conical shape with an inturned portion 8 adjacent the widest end thereof to assist in retaining the formed resilient material in the desired shape prior to assembly of the portions of the couplings. Frictional means is preferably provided between the outer surface of the rigid member 4 carried by one shaft and a cooperating element carried by the other shaft, so that driving torque is not transmitted by the housing member 7. Thus, the outer face 9 of the inturned portion or lip portion 8 is preferably irregular, as may be obtained for example by knurling or the like, so that upon abutment with a corresponding inturned portion of a cooperating portion, no slippage will occur.

In the modification of Figure 1, the portions A and B carried by each of the driving and driven shafts 1a and 1b, respectively, are substantially identical. The portions 7a and 7b of the housing, which serve as means for exerting axial pressure against the outer rigid members 4 and thus connect the outer members 4 of one section in driven relation to the shaft of the second section, are threaded together.

Figure 4:
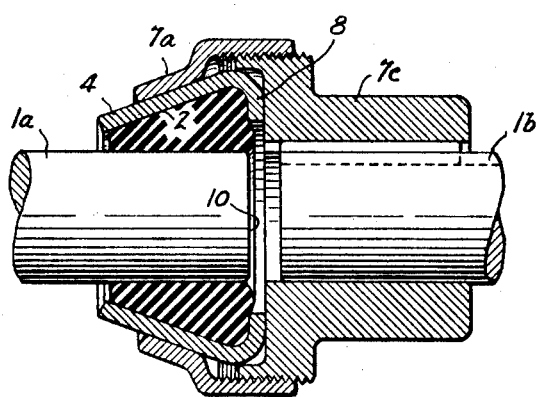
Fig. 4 is a vertical sectional view of a modified form of coupling embodying the present invention.

In the modification of Fig. 4, section B of Fig. 1 is substituted by a housing portion 7c, which is rigidly carried by the shaft 1b.

Figure 5:
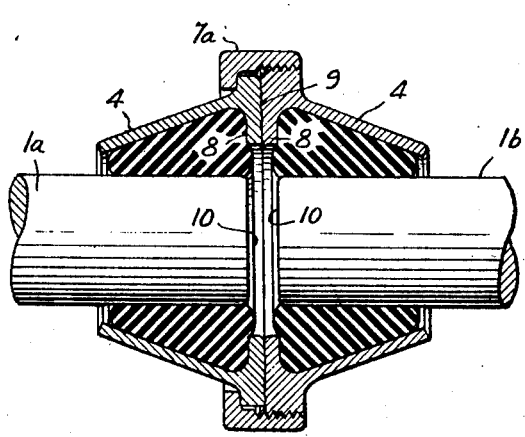
Fig. 5 is a vertical sectional view of another modified form of coupling embodying the present invention.

The modification of Fig. 5 is similar to that of Fig. 1 except that the housing portion 7a is threaded directly onto the outer rigid members 4 of one of the sections.

In the preparation of couplings embodying the present invention, the resilient member 5 may be assembled within the outer rigid member 4 and the shaft or inner member 1a, assembled in concentric relation in substantially the same manner as set forth in the Thiry Patent No. 1,782,770. Thus, referring to Figs. 2 and 3, the resilient member 5, which may have a rectangular or oblong cross-section and which preferably has a volume sufficiently large to fill the space between the outer surface 3 of the shaft or inner member and the inner surface 2 of the outer rigid member of the coupling, is forced by suitable means such as a plunger 12. The plunger 12 slides within the guides 13 through a tapered path within the guide 14 into the outer member 4. The diameter of the bore 15 within the annular resilient member 5, while disposed within the outer member 4, is substantially less than the outer diameter of the outer surface 3 of the shaft or inner member.

The shaft or inner member 3 is preferably provided with a tapered leader 16, the smallest end of which is sufficiently small to enter into the bore 15 and the largest end of which may be approximately equal to the diameter of the outer surface 3. By relative axial movement between the member 4 and the resilient material 5 within the outer member 4, the outer surface of the inner member 3 may be readily disposed within the bore 15 of the resilient material 5 concentric with the inner surface 2 of the rigid member 4, thus causing substantial deformation of the resilient material and a firm non-slipping union between the surface of the inner member and the inner surface of the outer member.

Figure 3:
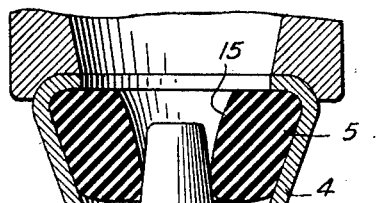
Fig. 3 is a vertical sectional view through a portion of the coupling members and a portion of apparatus used in the assembling of the coupling on the shaft, showing the second step in the assembling operation.

A lubricant which is readily absorbed by the resilient material 5 or a rubber-to-metal adhesive may be applied between the surface 3 or the surface of the leader member and the resilient material 5 during the assembly operation. The outer member 4 may also be adhesively bonded to the resilient material 5 and, if desired, the resilient material 5 may be molded and cured within the outer member 4 substantially as shown in Fig. 3. In such case the internal bore 15 of the mold member should be substantially smaller than the shaft or inner member.

If desired, the outer rigid member 4 may also comprise a plurality of longitudinal sections adhesively bonded or otherwise attached to the annular resilient member 5 at the external surface thereof. If the member 4 comprises a substantial number of sections attached only over a portion of their width to the resilient member 5, the resilient material and the outer rigid member 4 may be applied over the shaft or inner member by simply stretching the resilient member 5 to enlarge its internal bore and cause separation of the respective sections of the rigid member 4. The resilient material may then be compressed within a collar or housing portion 7a, similar to that illustrated in Fig. 4, radial compression being obtained by relative slippage of the members 7a and 4 during the threading of the collar on the member 7c.

Since the thickness of the resilient material 5 is adjacent the ends 10 of the shaft upon which they are carried, it is seen that greater ease of flow of resilient material or ease of distortion is had adjacent the ends of the shaft and failure due to substantial misalignment is therefore less likely.

Although several embodiments of the invention have been herein shown and described, it will be understood that numerous modifications of the construction shown may be resorted to without departing from the spirit of this invention as defined in the appended claims.

What I claim is:

1. A flexible coupling for rotating shafts comprising an annular resilient member disposed over an end portion of one of said shafts having substantially greater thickness adjacent said end portion, an outer member of rigid material having longitudinally tapered annular inner surface portions substantially concentric with the outer surface of said shaft and disposed over and bearing against an outer surface of said annular resilient member, portions of said tapered annular inner surface of said outer member bearing strongly against said outer surface of said resilient member and being of smaller diameter than that of corresponding contacting portions of said resilient member in its free state, whereby said resilient member is radially compressed between said shaft and said outer member, and a connector for connecting said outer member in driving relation to the other shaft.

2. A flexible coupling for rotating shafts comprising an inner shaft portion connected with a remaining portion of one of said shafts, an annular resilient member wedge-shaped in cross-section disposed over a portion of an outer surface of said shaft portion, and an outer member of rigid material having longitudinally tapered outer and inner surfaces substantially concentric with the outer surface of said shaft portion and bearing against an outer surface of said annular resilient member, portions of said outer member contacting said resilient member having a diameter less than the diameter of corresponding portions of said resilient member in the radially uncompressed state on said shaft portion, whereby said resilient member is compressed between said shaft and said inner surface of said outer member, and a connector for connecting said outer member in driving or driven relation with another shaft.

3. A flexible coupling for use between rotating shafts having at least one portion comprising an inner rigid shaft portion for connection to one of said shafts, an outer member of rigid material with a longitudinally tapered inner surface substantially concentric with the outer surface of the shaft portion, and an annular resilient member wedge-shaped in cross-section between said inner surface of said outer member and said shaft portion, and having its outer surface bearing against the inner surface of said outer member, the diameter of portions of said inner surface of said outer member bearing against portions of said annular resilient member being of lesser diameter than the diameter of the corresponding portions of said annular resilient member when in its radially uncompressed state with its inner surface bearing against an annular portion of the outer surface of said inner member, whereby said annular resilient member is under substantial radial compression between the outer surface of said shaft portion and the inner surface of said outer member and connects said outer member and said shaft portion in relatively nonslip relation, and connecting means for connecting said outer member in driving relation to the other of said shafts.

ROBERT IREDELL, Jr.

References Cited in the file of this patent

UNITED STATES PATENTS

| Number | Name | Date |
|---|---|---|
| 1,772,915 | Rosenberg | Aug. 12, 1930 |
| 1,871,963 | Dill | Aug. 16, 1932 |
| 1,983,094 | Neher | Dec. 4, 1934 |
| 2,084,761 | Bradley | June 22, 1937 |
| 2,295,316 | Yates | Sept. 8, 1942 |
| 2,562,359 | Iredell | July 31, 1951 |

FOREIGN PATENTS

| Number | Country | Date |
|---|---|---|
| 207,400 | Great Britain | 1923 |